United States Patent
Kase et al.

(10) Patent No.: US 10,141,571 B2
(45) Date of Patent: Nov. 27, 2018

(54) NICKEL-COBALT COMPOSITE HYDROXIDE AND METHOD AND DEVICE FOR PRODUCING SAME, CATHODE ACTIVE MATERIAL FOR NON-AQUEOUS ELECTROLYTE SECONDARY BATTERY AND METHOD FOR PRODUCING SAME, AND NON-AQUEOUS ELECTROLYTE SECONDARY BATTERY

(71) Applicant: SUMITOMO METAL MINING CO., LTD., Tokyo (JP)

(72) Inventors: Katsuya Kase, Ehime (JP); Yasutaka Kamata, Ehime (JP); Kazuomi Ryoshi, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 707 days.

(21) Appl. No.: 14/431,995

(22) PCT Filed: Sep. 27, 2013

(86) PCT No.: PCT/JP2013/076363
§ 371 (c)(1),
(2) Date: Mar. 27, 2015

(87) PCT Pub. No.: WO2014/051089
PCT Pub. Date: Apr. 3, 2014

(65) Prior Publication Data
US 2015/0243984 A1    Aug. 27, 2015

(30) Foreign Application Priority Data

Sep. 28, 2012 (JP) .................................. 2012-216000

(51) Int. Cl.
*H01M 4/525* (2010.01)
*C01G 53/00* (2006.01)
(Continued)

(52) U.S. Cl.
CPC ............ *H01M 4/525* (2013.01); *B01J 19/24* (2013.01); *C01G 53/00* (2013.01); *C01G 53/006* (2013.01);
(Continued)

(58) Field of Classification Search
CPC .. H01M 4/525; H01M 4/049; H01M 10/0525; H01M 2004/028; C01G 53/66;
(Continued)

(56) References Cited

U.S. PATENT DOCUMENTS 6,814,241 B1 * 11/2004 Galvin .................... B01J 8/22
209/158
2003/0054251 A1    3/2003 Ohzuku et al.
(Continued)

FOREIGN PATENT DOCUMENTS

CN    1372338 A    10/2002
JP    51-136572 A    11/1976
(Continued)

OTHER PUBLICATIONS

International Search Report and Written Opinion dated Jan. 7, 2014, from the corresponding PCT/JP2013/076363.
(Continued)

*Primary Examiner* — Lisa S Park
(74) *Attorney, Agent, or Firm* — Katten Muchin Rosenman LLP

(57) ABSTRACT

To improve cycling characteristics of a non-aqueous electrolyte secondary battery by obtaining a nickel-cobalt composite hydroxide having a sharp particle size distribution as a precursor, a slurry including a nickel-cobalt composite hydroxide obtained by continuously supplying an aqueous solution that includes at least nickel and cobalt, an ammonium ion donor aqueous solution and a caustic alkali aqueous solution to a reaction vessel and reacting, is continu- (Continued)

ously extracted and separated into a large particle size portion and s small particle size portion by classification, and the small particle size portion is continuously returned to the reaction vessel. As a result, a nickel-cobalt composite hydroxide is obtained that is expressed by the general formula: $Ni_{1-x-y}Co_xM_y(OH)_2$ (where, $0.05 \leq x \leq 0.50$, $0 \leq y \leq 0.10$, $0.05 \leq x+y \leq 0.50$, and M is at least one kind of metal element selected from among Al, Mg, Mn, Ti, Fe, Cu, Zn and Ga, and that satisfies the relationships $(D50-D10)/D50 \leq 0.30$, and $(D90-D50)/D50 \leq 0.30$ among D10, D50 and D90 of this composite hydroxide.

2 Claims, 3 Drawing Sheets

(51) Int. Cl.
  *B01J 19/24* (2006.01)
  *H01M 4/04* (2006.01)
  *H01M 10/0525* (2010.01)
  *H01M 4/02* (2006.01)

(52) U.S. Cl.
  CPC .......... *C01G 53/42* (2013.01); *C01G 53/66* (2013.01); *H01M 4/049* (2013.01); *H01M 10/0525* (2013.01); *B01J 2219/00033* (2013.01); *B01J 2219/24* (2013.01); *C01P 2004/51* (2013.01); *C01P 2004/61* (2013.01); *C01P 2006/11* (2013.01); *H01M 2004/028* (2013.01)

(58) Field of Classification Search
  CPC ...... C01G 53/42; C01G 53/006; C01G 53/00; B01J 19/24; B01J 2219/24; B01J 2219/00033; C01P 2004/61; C01P 2004/51; C01P 2006/11
  See application file for complete search history.

(56) References Cited

U.S. PATENT DOCUMENTS

| 2004/0091778 | A1* | 5/2004 | Ozaki | H01M 4/1391 429/231.1 |
| 2005/0079416 | A1* | 4/2005 | Ohzuku | H01M 4/485 429/231.1 |
| 2006/0057466 | A1* | 3/2006 | Suhara | H01M 4/1315 429/322 |
| 2009/0029253 | A1 | 1/2009 | Itou et al. | |
| 2012/0276454 | A1* | 11/2012 | Mori | H01M 4/485 429/223 |
| 2013/0337331 | A1 | 12/2013 | Mori et al. | |

FOREIGN PATENT DOCUMENTS

| JP | 3-94902 U | 9/1991 |
| JP | 9-270258 A | 10/1997 |
| JP | 10-265225 | 10/1998 |
| JP | 2000-334202 A | 12/2000 |
| JP | 2003-86182 A | 3/2003 |
| JP | 2011-187174 A | 9/2011 |
| JP | 4840545 B1 | 12/2011 |
| WO | 2011067937 | 6/2011 |

OTHER PUBLICATIONS

Microfilm of the specification and drawings annexed to the request of Japanese Utility Model Application No. 2588/1990 (Laid-open No. 94902/1991) (Ishikawajima-Harima Heavy Industries Co., Ltd.) Sep. 27, 1991 (Sep. 27, 1991), p. 3, lines 4 to 7; examples (Family: none).

* cited by examiner

NICKEL-COBALT COMPOSITE HYDROXIDE AND METHOD AND DEVICE FOR PRODUCING SAME, CATHODE ACTIVE MATERIAL FOR NON-AQUEOUS ELECTROLYTE SECONDARY BATTERY AND METHOD FOR PRODUCING SAME, AND NON-AQUEOUS ELECTROLYTE SECONDARY BATTERY

TECHNICAL FIELD

The present invention relates to a nickel-cobalt composite hydroxide and method and device for producing the same. The present invention also relates to a cathode active material for a non-aqueous electrolyte secondary battery that uses the nickel-cobalt hydroxide as raw material and method for producing the same, and also relates to a non-aqueous electrolyte secondary battery that uses the cathode active material for a non-aqueous electrolyte secondary battery as cathode material.

BACKGROUND ART

In recent years, as electronic technology advances, making electronic devices more compact and lightweight has been rapidly advancing. Particularly, due to the spread and increased functions of portable electronic devices such as portable telephones or notebook computers, as the portable power supplies of these devices, there is a demand for development of secondary batteries that have high energy density, are compact and lightweight. To satisfy such a demand, lithium-ion secondary batteries, which are non-aqueous electrolyte secondary batteries are frequently used. Lithium-ion batteries are not limited to this kind of use, and research and development with the aim at using such batteries as a large power source for hybrid automobiles and electric automobiles is also advancing. As the cathode active material of lithium-ion secondary batteries, a lithium-cobalt composite oxide ($LiCoO_2$) which can be relatively readily synthesized is mainly used.

However, expensive and rare cobalt compounds are included in the raw material of the lithium-cobalt composite oxide. Therefore, the cost per volume of a lithium-cobalt secondary battery that uses a lithium-cobalt composite oxide as the cathode material can reach up to approximately four times that of a nickel-metal hydride battery. Due to this high cost, at the present time the uses of lithium-ion batteries are rather limited. Consequently, lowering the cost of cathode active material and making it possible to provide less expensive lithium-ion secondary batteries has very large significance for making current portable electronic device more lightweight and compact.

A lithium-manganese composite oxide ($LiMn_2O_4$) that uses manganese that is less expensive than cobalt and lithium-nickel composite oxide ($LiNiO_2$) that uses nickel are being investigated as cathode active material for a lithium-ion battery that can replace lithium-cobalt composite oxide.

Of these, lithium-manganese composite oxide is a material having inexpensive manganese as a raw material, and is a safe material that has excellent heat stability. However, the theoretical capacity is only about half that of a lithium-cobalt composite oxide, so has a disadvantage in that it would be difficult to answer the need for ever increasing high capacity of a lithium-ion secondary battery. Moreover, at temperatures of 45° C. or greater, there is a disadvantage in that self discharge is extreme, and there is decreased charge and discharge life.

On the other hand, lithium-nickel composite oxide, similar to manganese, can be obtained inexpensively and stably, and has a higher capacity when compared with lithium-cobalt oxide, so is expected to become mainstream as the next generation cathode active material, so much research and development is actively being advanced. However, a lithium-ion secondary battery that uses a lithium-nickel composite oxide composed of only lithium and nickel as the cathode active material has a problem of inferior cycling characteristics when compared with using a lithium-cobalt composite oxide. This is because in a lithium-nickel composite oxide, as the lithium separates, the crystal structure between hexagonal crystals and monoclinic crystals changes (phase transition), and due to the lack of reversibility of that change, as the charging and discharging reaction is repeated, the sites where lithium can separate and be inserted are gradually lost.

In order to solve this problem, replacing part of the nickel with cobalt is being studied. By this replacement, the crystal structure of the lithium-nickel composite oxide is stabilized, and phase transition of the crystal structure as lithium is separated is suppressed. In this case, as the amount of replacement cobalt increases, the crystal structure becomes more stable and the cycling characteristics are improved, however, there is a problem of an increase in cost. In order to obtain the effect above while at the same time keeping the amount of replacement cobalt small, uniformly dispersing cobalt on an atomic level into a nickel composite hydroxide precursor is effective.

As a method for making it possible to uniformly disperse cobalt is a reactive crystallization method. For example, JP H09-270258 (A) discloses a continuous crystallization method in which a nickel salt aqueous solution, a cobalt salt aqueous solution and a caustic alkali aqueous solution are continuously supplied into a reaction vessel in which the pH value and temperature are adjusted, while keeping the concentration and flow rate controlled, and by collecting the product from the reaction aqueous solution that overflows from the reaction vessel, the characteristics of the obtained nickel-cobalt composite hydroxide are controlled. With this kind of continuous crystallization method, stability of the crystal structure of the nickel-cobalt composite hydroxide is improved, and phase transition due to charging and discharging is suppressed. In addition, the crystal particle boundaries that are a cause of the breakdown of particle structure become very few, and it is possible to prevent the particles from becoming minute and falling off, so it is possible to obtain a cathode active material that has good cycling characteristics.

However, when producing nickel-cobalt composite hydroxide with this kind of continuous crystallization method, the particle size distribution becomes a normal distribution and spreads easily, so it become very difficult to obtain particles having a uniform particle size. Using a cathode active material having particles with a wide particle size distribution causes uneven voltage to be applied to particles inside an electrode, and as charging and discharging is repeated, minute particles selectively deteriorate, and the capacity of the lithium-ion battery decreases. Therefore, in the continuous crystallization method described above, it is not possible to sufficiently improve cycling characteristics of the cathode active material.

In order to obtain particles having a sharp particle size distribution, a batch method is more useful than a continuous crystallization method, however, a batch method has a disadvantage in that productivity is inferior to a continuous crystallization method. Particularly, when trying to obtain large particles that are 10 μm or more by a batch method, it is necessary to increase the amount of raw material supplied, however, in order to do so a large reaction vessel must be used, and productivity becomes even worse.

For these reasons, even for the case of a continuous crystallization method, development of a method for obtaining a nickel composite hydroxide having a sharp particle distribution is being pursued. For example, JP H10-265225 (A) and JP 2003-086182 (A) disclose technology for recovering particles produced by a continuous crystallization method while performing classification. More specifically, a classifying system is disclosed in which by constructing the reaction vessel so as to have a main body and a separation apparatus that is integrally provided on the bottom side of the main body, particles that are grown inside the main body and whose specific gravity have increased are collected and recovered by the separation apparatus that is provided on the bottom side of the main body, and underdeveloped particles are pushed back into the main body by the upward flow inside the separation apparatus. With this kind of method, even in the case of a continuous crystallization method, it is possible to obtain particles having a sharp particle size distribution. However, with this technology, it is necessary to strictly manage the crystallization conditions, so application to production on an industrial scale is difficult, and because the reaction process and separation process are performed in one reaction, there is a possibility that underdeveloped particles will be mixed in, and there are limits to being able to make the recovered particles uniform.

RELATED LITERATURE

Patent Literature

[Patent Literature 1] JP H09-270258 (A)
[Patent Literature 2] JP H10-265225 (A)
[Patent Literature 3] JP 2003-086182 (A)

SUMMARY OF INVENTION

Problem to be Solved by Invention

Taking into consideration the situation described above, the object of the present invention is to provide a nickel-cobalt composite hydroxide having a sharp particle size distribution. Moreover, another object of the present invention is to provide a production method and production device for producing the nickel-cobalt composite hydroxide by a continuous crystallization method that is advantageous for production on an industrial scale. Furthermore, another object of the present invention is to provide a non-aqueous electrolyte secondary battery that has excellent cycling characteristics by forming a cathode active material with the nickel-cobalt composite hydroxide as a precursor and using that cathode active material as a cathode.

Means for Solving Problems

The inventors, in order to accomplish the objective above, earnestly examined a nickel-cobalt composite hydroxide that is used as a precursor to a cathode active material for a non-aqueous electrolyte secondary battery and a production method thereof. As a result, it was found that it is possible to efficiently produce particles having a uniform particle size by continuously supplying an aqueous solution that includes nickel and cobalt, an aqueous solution that includes an ammonium ion donor, and a caustic alkali aqueous solution to a reaction vessel while mixing, continuously extracting a slurry that includes the nickel-cobalt composite hydroxide that was generated by a crystallization reaction from the reaction vessel, separating that slurry into a large particle size portion and small particle size portion by classification, and continuously returning the small particle size portion to the reaction vessel.

In other words, the nickel-cobalt composite hydroxide of the present invention is expressed by the general formula: $Ni_{1-x-y}Co_xM_y(OH)_2$ (where, $0.05 \leq x \leq 0.50$, $0 \leq y \leq 0.10$, $0.05 \leq x+y \leq 0.50$, and M is at least one kind of metal element selected from among Al, Mg, Mn, Ti, Fe, Cu, Zn and Ga, and satisfies the relationships $(D50-D10)/D50 \leq 0.30$, and $(D90-D50)/D50 \leq 0.30$ among D10, D50 and D90 of this nickel-cobalt composite hydroxide.

Preferably, the tap density of the nickel-cobalt composite hydroxide is 2.0 g/cm$^3$ or greater. Moreover, the average particle size of the nickel-cobalt composite hydroxide is preferably within the range 10 μm to 30 μm.

The method for producing the nickel-cobalt composite hydroxide of the present invention, includes: a reaction process for obtaining a nickel-cobalt composite hydroxide by continuously supplying an aqueous solution that includes nickel and cobalt, an aqueous solution that includes an ammonium ion donor, and a caustic alkali aqueous solution to a reaction vessel and causing a reaction; a separation process for continuously extracting a slurry that includes the nickel-cobalt composite hydroxide from the reaction vessel, and separating that slurry into a large particle size portion and small particle size portion by classification; and a reflux process for continuously returning the small particle size portion to the reaction vessel.

The separation process preferably uses a wet separation apparatus that uses centrifugal force.

Preferably, the production method further includes a process for covering the surface area of the large particle size portion that was separated with an added element M (where M is at least one kind of metal element selected from among Al, Mg, Mn, Ti, Fe, Cu, Zn and Ga).

A production device for producing the nickel-cobalt composite hydroxide of the present invention includes: a reaction vessel; means for continuously supplying an aqueous solution that includes nickel and cobalt, an aqueous solution that includes an ammonium ion donor, and a caustic alkali aqueous solution to the reaction vessel; means for continuously extracting nickel-cobalt composite hydroxide that was generated by a reaction inside the reaction vessel from the reaction vessel; a separation apparatus that separates the extracted nickel-cobalt composite hydroxide into a large particle size portion and a small particle size portion by classification; and a reflux apparatus that continuously returns the small particle size portion that was separated out to the reaction vessel.

The cathode active material for a non-aqueous electrolyte secondary battery of the present invention includes a hexagonal crystal lithium-nickel-cobalt composite oxide having a layered structure that is expressed by the general formula: $Li_{1+u}Ni_{1-x-y}Co_xM_yO_2$ (where $0 \leq u \leq 0.30$, $0.05 \leq x \leq 0.50$, $0 \leq y \leq 0.10$, $0.05 \leq x+y \leq 0.50$, and M is at least one kind of metal element selected from among Al, Mg, Mn, Ti, Fe, Cu, Zn and Ga), and satisfies the relationships $(D50-D10)/D50 \leq 0.30$ and $(D90-D50)/D50 \leq 0.30$ among D10, D50 and D90 of the lithium-nickel-cobalt composite oxide.

The tap density of the cathode active material for a non-aqueous electrolyte secondary battery is preferably 2.0 g/cm$^3$ or greater. Moreover, the average particle size of the cathode active material for a non-aqueous electrolyte secondary battery is preferably within the range 10 µm to 30 µm.

The method for producing a cathode active material for a non-aqueous electrolyte secondary battery of the present invention includes: a mixing process for forming a lithium mixture by mixing the nickel-cobalt composite hydroxide or a nickel-cobalt composite oxide that is obtained by roasting that nickel-cobalt composite hydroxide in an oxidizing atmosphere at a temperature of 300° C. to 700° C., and a lithium compound; and a calcination process for performing calcination of this lithium mixture in an oxidizing atmosphere at a temperature of 600° C. to 850° C.

The non-aqueous electrolyte secondary battery of the present invention includes a cathode, an anode, a separator and a non-aqueous electrolyte, and that uses the cathode active material for a non-aqueous electrolyte secondary battery as the cathode material of the cathode.

Effect of Invention

With the present invention, it is possible to obtain a nickel-cobalt composite hydroxide having a very sharp particle size distribution. Therefore, it is possible to improve the cycling characteristics of a non-aqueous electrolyte secondary battery that uses a cathode that is obtained by using that nickel-cobalt composite hydroxide as a precursor. Moreover, with the present invention, the raw materials can be used without waste, so not only is it possible to reduce costs, but it is also possible to improve productivity, so the invention has very large industrial significance.

MODES FOR CARRYING OUT INVENTION

Figure 1:
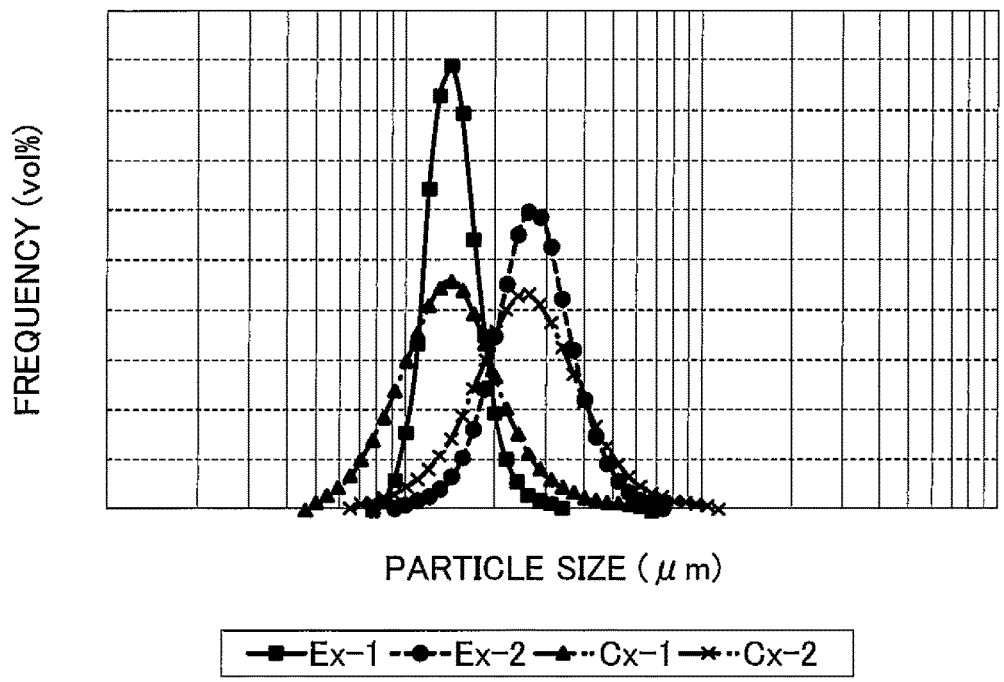
FIG. 1 is a graph illustrating the particle size distribution of nickel-cobalt hydroxide that is obtained by the production method of the present invention, and obtained by a conventional production method.

In the following, the present invention will be explained in detail by dividing the explanation into: 1) nickel-cobalt composite hydroxide and production method and production device thereof, 2) cathode active material for a non-aqueous electrolyte secondary battery and production method thereof; and 3) non-aqueous electrolyte secondary battery. In the present invention, the average particle size and crystal shape can be adjusted by controlling the conditions when producing the nickel-cobalt composite hydroxide, however, in the following, the explanation will mainly center on an example of producing a nickel-cobalt composite hydroxide having a spherical crystal shape and average particle size within the range of 10 µm to 30 µm.

1. Nickel-Cobalt Composite Hydroxide and Production Method Thereof (1) Nickel-Cobalt Composite Hydroxide The nickel-cobalt composite hydroxide of the present invention (hereafter referred to as "composite hydroxide") is a composite hydroxide that is expressed by the general formula: $Ni_{1-x-y}Co_xM_y(OH)_2$ (where, $0.05 \leq x \leq 0.50$, $0 \leq y \leq 0.10$, $0.05 \leq x+y \leq 0.50$, and M is at least one kind of metal element selected from among Al, Mg, Mn, Ti, Fe, Cu, Zn and Ga, and among D10, D50 and D90 of this composite hydroxide, the relationships $(D50-D10)/D50 \leq 0.30$, and $(D90-D50)/D50 \leq 0.30$ are satisfied. In other words, the composite hydroxide of the present invention has a particle size distribution that is very sharp.

(Composition)

In the formula above, the value of x that indicates the added amount of cobalt (Co) is 0.05 to 0.50, and preferably 0.10 to 0.50, and even more preferably 0.10 to 0.30. When the value of x is less than 0.05, the effect from adding Co cannot be sufficiently obtained. On the other hand, when the value of x is greater than 0.50, the raw material cost increases.

Moreover, the value of y that indicates the added amount of the added element M is 0 to 0.10, and preferably 0.01 to 0.09 and even more preferably 0.02 to 0.08. When the value of y is greater than 0.10, the electrical charge and discharge capacity decreases.

As the added element M, it is possible to use as least one kind of metal that is selected from among aluminum (Al), magnesium (Mg), manganese (Mn), titanium (Ti), iron (Fe), copper (Cu), zinc (Zn) and gallium (Ga), however, from the aspect of cost and electrical properties, preferably aluminum and/or magnesium are used.

The total added amount of cobalt and the added element M is 0.05 to 0.50, and preferably 0.05 to 0.40 and even more preferably 0.05 to 0.25. When the total added amount of cobalt and the added element M is less than 0.05, it is not possible to obtain the effect from adding cobalt and the added element M. On the other hand, when the total added amount of cobalt and the added element M is greater than 0.50, not only does the raw material cost increase, but the electrical charge and discharge capacity decreases and the merits of the nickel (Ni) based cathode active material is lost.

(Particle Size Distribution)

The composite hydroxide of the present invention is such that among D10, D50 and D90, the relationships $(D50-D10)/D50 \leq 0.30$ and $(D90-D50)/D50 \leq 0.30$ are satisfied. Here, D10, D50 and D90 are particle sizes that respectively correspond to 10%, 50% and 90% of the integrated value of the particle size distribution. The method for finding D10, D50 and D90 is not particularly limited, and for example, the values can be found from the volume-integrated value that is measured using a laser diffraction scattering particle size analyzer.

By the relationships above being satisfied among D10, D50 and D90, the particle size distribution of the composite hydroxide can be said to be very sharp, so when a secondary battery is made using cathode active material that was obtain with this composite hydroxide as a precursor, it is possible to sufficiently improve the cycling characteristics. More specifically, the capacity maintenance rate, which is an index of the cycling characteristics of a non-aqueous electrolyte secondary battery, is 97.5% or greater. On the other hand, when the value of either one of the relationships (D50−D10)/D50 and (D90−D50)/D50 is greater than 0.30, the uniformity of the particle size worsens, and it becomes impossible to sufficiently improve the cycling characteristics of a non-aqueous electrolyte secondary battery that uses a cathode active material made from a lithium-nickel-cobalt composite oxide (hereafter referred to as "lithium composite oxide") using this nickel-cobalt composite hydroxide as a precursor. Here, the capacity maintenance rate in the present invention is the capacity maintenance rate when a non-aqueous electrolyte secondary battery is made and left alone for a set amount of time, and after the open circuit voltage (OCV) has become stable, an electrical charge and discharge test is repeated for 25 cycles at 25° C. with a current density with respect to the cathode of 0.5 mA/cm$^2$ and a cutoff voltage of 4.3V to 3.0V (=electrical discharge capacity/initial electrical discharge capacity×100 after 25 cycles).

From the aspect of further improving the cycling characteristics of a non-aqueous electrolyte secondary battery, preferably the relationships of (D50−D10)/D50≤0.27 and (D90−D50)/D50≤0.27, and even more preferably (D50−D10)/D50≤0.20 and (D90−D50)/D50≤0.20 are satisfied among D10, D50 and D90. Such values of (D50−D10)/D50 and (D90−D50)/D50 can be achieved by repeating the reaction process, separation process and reflux process in the production process of the composite hydroxide.

(Tap Density)

The structure and size of the cathode active material is affected by the composite hydroxide precursor. Therefore, the composite hydroxide of the present invention preferably has a tap density, which is an index of the packing ability, of 2.0 g/cm$^3$ or greater, and preferably 2.2 g/cm$^3$ or greater. Here, the tap density indicates the density after tapping collected test powder into a container 100 times based on Japanese Industrial Standard JIS Z-2504, and can be measured by using a shaking-type specific gravity measurement device.

When the tap density of the composite hydroxide is within such a range, it is possible for the battery properties of a non-aqueous electrolyte secondary battery that uses the lithium composite oxide, which is obtained with this composite hydroxide as a precursor, as a cathode active material to become even better. On the other hand, when the tap density is less than 2.0 g/cm$^3$, the packing density of the cathode active material is not sufficient, and it may not be possible to improve the properties of the secondary battery that is obtained. The upper limit of the tap density is not limited, however, in the embodiment of the present invention, the upper limit is taken to be 2.4 g/cm$^3$.

(Average Particle Size)

The average particle size of the composite hydroxide is preferably within the range 10 μm to 30 μm, and more preferably within the range 13 μm to 26 μm, and even more preferably within the range 15 μm to 25 μm. The average particle size in the present invention is a particle size that corresponds to when the integrated value of the particle size distribution is 50%, or in other words, D50 (median size). When the average particle size of the composite hydroxide is within such a range, it is possible to obtain a non-aqueous electrolyte secondary battery that uses the lithium composite oxide, which is obtained with this composite hydroxide precursor, as a cathode active material that has better battery properties. Particularly, by controlling the average particle size to such a range together with controlling the tap density to the range described above, the capacity maintenance rate can preferably be made to be 98.0% or greater and more preferably 98.5% or greater.

On the other hand, when the average particle size is less than 10 μm, the packing density of the cathode active material is not sufficient, and it may not be possible to sufficiently improve the properties of the secondary battery. When the average particle size is greater than 30 μm, the specific surface area of the cathode active material decreases, and similarly it may not be possible to sufficiently improve the properties of the secondary battery.

(2) Method for Producing Nickel-Cobalt Composite Hydroxide

Figure 2:
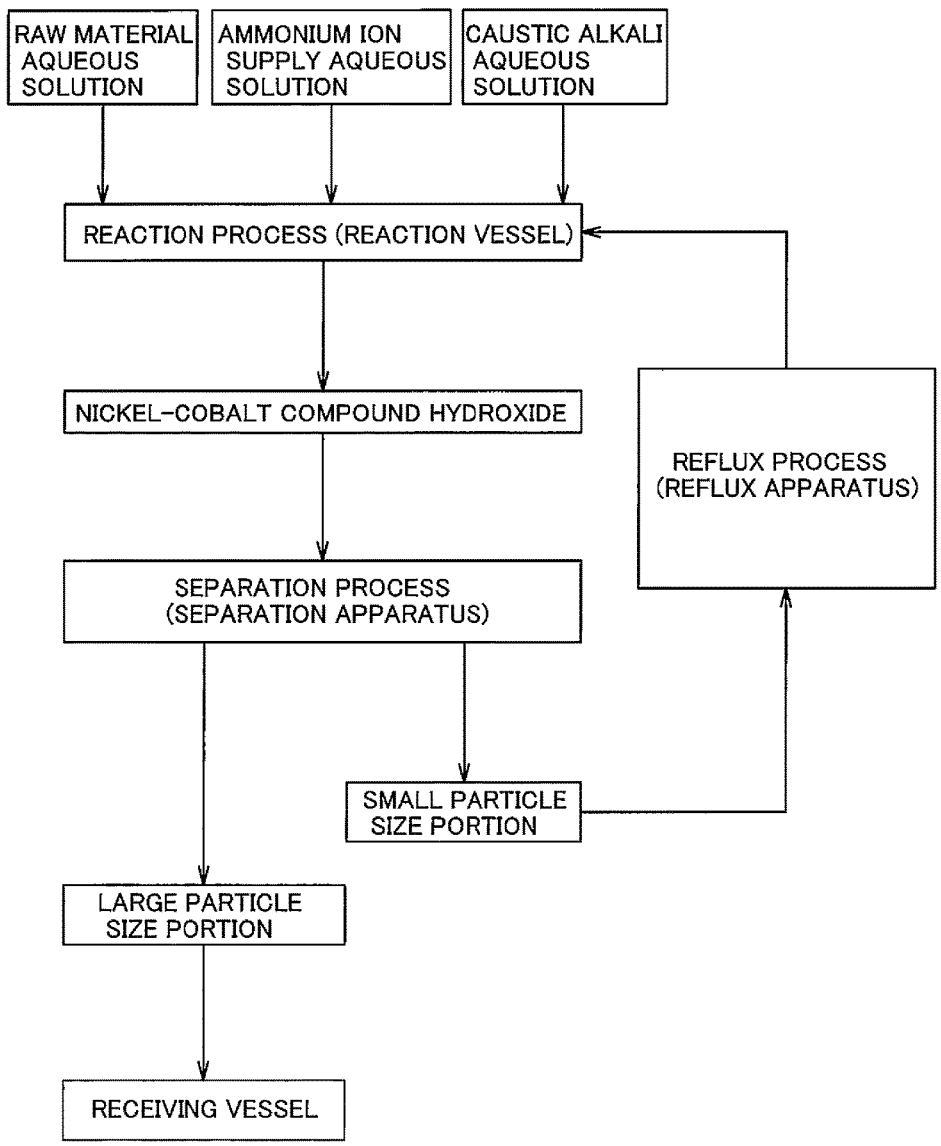
FIG. 2 is a flowchart that schematically illustrates the production process for producing the nickel-cobalt hydroxide of the present invention.

The method for producing the composite hydroxide of the present invention, as illustrated in FIG. 2, includes: a reaction process that obtains a composite hydroxide by continuously supplying an aqueous solution that includes nickel and cobalt, an aqueous solution that includes an ammonium ion donor and a caustic alkali aqueous solution into a reaction vessel while mixing, and causing a reaction; a separation process that extracts a slurry that includes the composite hydroxide from the reaction vessel and classifies the composite hydroxide into a portion having a large particle size and a portion having a small particle size; and a reflux process that continuously returns the portion with a small particle size that was obtained in the separation process to the reaction vessel. In this kind of production method, a separation process and reflux process are separately provided in addition to an existing reaction process, so when compared to a method that performs classification simultaneously with the reaction process, there are fewer restrictions on the crystallization conditions of the composite hydroxide and the like, and it is possible to select only conditions that are useful for particle growth, so is advantageous for production on an industrial scale. Moreover, there is no possibility for underdeveloped particles to be mixed in, and the recovered particles are more uniform. Each process will be explained in detail below.

(2-1) Reaction Process

The reaction process is a process of continuously generating a composite hydroxide that is expressed by the general formula described above by continuously supplying an aqueous solution that includes nickel and cobalt (hereafter, referred to as a "raw material aqueous solution"), an aqueous solution that includes an ammonium ion donor (hereafter, referred to as an "ammonium ion supply aqueous solution"), and a caustic alkali aqueous solution into a reaction vessel while mixing, to form a reaction aqueous solution from these mixed aqueous solutions and causing a crystallization reaction to occur. Here, the added amount of the caustic alkali aqueous solution is adjusted and supplied so that the pH value of the reaction aqueous solution is maintained within a specified range.

In this kind of continuous crystallization method, by controlling the pH value of the reaction aqueous solution, it is possible to control the crystal structure and the powder characteristics of the obtained composite hydroxide. In other words, in this kind of continuous crystallization, at the instant that the nickel concentration, cobalt concentration and added element M concentration of the reaction aqueous solution that is formed inside the reaction vessel becomes greater than the solubility (saturation solubility) of nickel, cobalt and added element M of the reaction aqueous solution, a crystallization reaction of the reaction aqueous solution occurs, however, by controlling the pH value of the reaction aqueous solution at this time and adjusting the solubility, it is possible to control the crystal structure and powder characteristics of the obtained composite hydroxide.

However, when simply supplying the raw material aqueous solution to a reaction vessel having a low solubility, when the difference between the solubility at that pH value and the concentration of the metal component in the raw material aqueous solution is large, a composite hydroxide that is fine and has an irregular shape is instantly precipitated out. In the present invention, from the aspect of preventing this to occur, an ammonium ion supply aqueous solution is supplied into the reaction vessel at the same time as the raw material aqueous solution, and by forming respective complex ions of nickel, cobalt and added element M, the solubility of the metal component is kept stable on the high side even at the same pH value. As a result, it is possible to precipitate out the composite hydroxide gradually, and by repeating the precipitation and redissolving processes, it is possible to cause the composite hydroxide to grow into a spherical shape. Moreover, by adjusting the ammonium ion concentration of the ammonium ion supply aqueous solution, it is possible to perform control so that the crystal structure of the composite hydroxide becomes a desired shape.

(Reaction Conditions)

The conditions for the reaction process are appropriately selected according to the size of the reaction vessel, the size and shape of the mixing blade, or the size and shape of the target particles, and cannot be uniquely determined. Particularly, in the present invention, nucleation and particle growth proceed simultaneously inside the same reaction vessel, so depending on the reaction conditions, the particle size distribution of the obtained composite hydroxide may become wide, and in that case, the load of the separation process described later increases, and there is a possibility that the overall productivity will worsen. Moreover, there is also a possibility that coarse particles will be generated due to repeating the reaction process, separation process and reflux process, and the particle size distribution will become even wider. Therefore, from the aspect of controlling the particle size distribution of the obtained composite hydroxide to be within a specified range, appropriately adjusting the conditions of the reaction process is preferred.

For example, when trying to obtain spherical composite hydroxide with a particle size of 10 μm to 30 μm using a reaction vessel having a 34 L capacity, and 2 to 5 propeller blades having a diameter of 7 cm to 15 cm (inclination angle of 15° to 45°), preferably the reaction conditions are adjusted as below.

The pH value of the reaction aqueous solution at a standard liquid temperature of 25° C. is preferably 11.8 or greater, and more preferably 12.0 or greater. When the pH value is less than 11.8, the tap density of the composite hydroxide becomes low, and there is a possibility that the properties of the battery that is finally obtained will worsen. The upper limit of the pH value at a standard liquid temperature of 25° C. is preferably about 13.0, and more preferably about 12.8. This is because when the pH value is greater than 13.0, it becomes easy for nucleation and particle growth to proceed simultaneously, and it becomes difficult to obtain a composite hydroxide having an average particle size that is within the range of 10 μm to 30 μm, and a sharp particle size distribution.

The liquid temperature of the reaction aqueous solution is preferably 35° C. or greater, and more preferably 40° C. or greater. When the liquid temperature is less than 35° C., the tap density of the composite hydroxide becomes low, and similarly, there is a possibility that the properties of the battery that is finally obtained will worsen. The upper limit of the liquid temperature is preferably about 40 to 60° C., and more preferably about 50° C. This is because when the liquid temperature is greater than 60° C., the volatilization volume of ammonia increases, and the concentration of complex ions of nickel, cobalt and added element M becomes unstable.

Moreover, the mixing speed of the reaction aqueous solution is preferably controlled to be within the range of 600 rpm to 1400 rpm, and more preferably controlled to be within the range of 700 rpm to 1300 rpm. When the mixing speed is less than 600 rpm, it becomes difficult to uniformly mix the raw material aqueous solution, the ammonium ion supply aqueous solution and the caustic alkali aqueous solution. On the other hand, when the mixing speed is greater than 1400 rpm, the generated composite hydroxide particles collide, and there is a possibility that fine particles will be generated. Therefore, in any case, the particle size distribution of the obtained composite hydroxide easily spreads.

(Raw Material Aqueous Solution)

The raw material aqueous solution is not particularly limited, however, preferably an aqueous solution will used in which nitrates, sulfates or hydrochlorides of nickel and cobalt or the like are dissolved; and from the aspect of preventing halogen contamination and the aspect of cost, preferably an aqueous solution of sulfates of these is used.

The concentration of the raw material aqueous solution is such that the total of nickel salt and cobalt salt is preferably 1.0 mol/L to 2.4 mol/L, and more preferably 1.5 mol/L to 2.4 mol/L, and even more preferably 2.0 mol/L to 2.4 mol/L. When the concentration of the raw material aqueous solution is less than 1.0 mol/L, the amount of crystallization per reaction vessel decreases, and thus productivity decreases, which is not desirable. On the other hand, when the salt concentration of the raw material aqueous solution is greater than 2.4 mol/L, the concentration is greater than the saturation solubility of the raw material aqueous solution and metal salts precipitate out into the raw material aqueous solution, so there is a possibility a composite hydroxide having a structure that is different than the target structure will be generated.

Moreover, the nickel salt and cobalt salt do not absolutely need to be supplied into the reaction vessel as raw material aqueous solution. For example, when using nickel salt and cobalt salt that react and generate a compound other than the target composite hydroxide when mixed, it is possible to prepare a nickel salt aqueous solution and cobalt salt aqueous solution separately, and adjust the total concentration of the nickel salt and cobalt salt that are included in these aqueous solutions to be within the range above, then simultaneously supply the aqueous solutions into the reaction vessel in specified ratios.

(Added Element M)

As described above, it is possible to include an added element (M is at least one kind of metal selected from among Al, Mg, Mn, Ti, Fe, Cu, Zn and Ga) in the composite hydroxide of the present invention.

When dispersing added element M uniformly into the composite hydroxide, an aqueous solution in which a salt that includes the added element M described above is dissolved can be added to the aqueous solution that includes a nickel salt and cobalt salt, or an aqueous solution in which a salt that includes the added element M is dissolved can be supplied simultaneously into the reaction vessel with the aqueous solution that includes a nickel salt and cobalt salt, and co-precipitation can be performed with the added element M uniformly dispersed into the composite hydroxide.

However, the added element M does not absolutely need to be added in the reaction process, and it is possible to cover the surface of the composite hydroxide that is obtained according to the present invention with the added element M. In that case, the portion having a large particle size that was obtained by the separation process that will be described later is mixed with an aqueous solution in which a salt that includes the added element M is dissolved, or mixed with an alkoxide solution of the added element M to make a slurry, and by precipitating out the added element M onto the surface of the composite hydroxide by the crystallization reaction, while at the same time controlling the slurry so as to have a specified pH value, it is possible to uniformly cover the surface of the composite hydroxide with the added element M. Moreover, it is also possible to cover the surface of the composite hydroxide with the added element M by spraying an aqueous solution or slurry that includes the added element M onto the large particle size portion and allowing it to dry. Furthermore, it is also possible to cover the surface of the composite hydroxide with the added element M by spraying and drying slurry in which salts that include the large particle size portion and the added element M are suspended, or by mixing salts that include the composite hydroxide and the added element M by a solid phase method.

(Ammonium Ion Supply Aqueous Solution)

The ammonium ion supply aqueous solution that is used in the present invention in not particularly limited, however, preferably is an aqueous solution that includes, ammonia water, or ammonium sulfate, or ammonium chloride, and from the aspect of preventing halogen contamination, is more preferably an aqueous solution that includes ammonium water or ammonium sulfate.

When ammonium water is used as the ammonium ion supply aqueous solution, it is possible to use as is a typical commercial product having an ammonium ion concentration of about 25 mass % to 30 mass %. When the ammonium ion concentration is too low compared to the range above, a large amount of ammonium ion supply aqueous solution must be supplied in order to supply the specified amount of ammonium ions, so productivity decreases. On the other hand, when the ammonium ion concentration is greater than the range above, there is no particular problem as long as the ammonium ions are supplied smoothly, however, when the ammonium ion concentration becomes high and is greater than 30 mass %, the volatilization volume of ammonia increases and safe operation becomes difficult.

(Caustic Alkali Aqueous Solution)

In the present invention, a caustic alkali aqueous solution is used as a pH regulating agent for neutralization. As this kind of caustic alkali aqueous solution, it is possible to use a sodium hydroxide aqueous solution, a potassium hydroxide aqueous solution, a lithium hydroxide aqueous solution or the like, however, from the aspect of ease of use and cost, preferably a sodium hydroxide aqueous solution is used.

The concentration of the caustic alkali aqueous solution is preferably 10 mass % to 30 mass %, and more preferably 15 mass % to 25 mass %. When the concentration is less than 10 mass %, the amount of caustic alkali aqueous solution that is necessary for pH adjustment increases, and thus productivity decreases. On the other hand, when the concentration is greater than 30 mass %, caustic alkali crystals precipitate out into the caustic alkali aqueous solution, or the viscosity of the caustic alkali aqueous solution becomes high, so there is a possibility that a problem of a mechanical load being applied to the reaction apparatus will occur.

Preferably, the supply of the caustic alkali aqueous solution is appropriately adjusted according to the amount of the raw material aqueous solution and the ammonium ion supply aqueous solution so that the concentration of the caustic alkali aqueous solution is preferably 10 mass % to 30 mass %.

(2-2) Separation Process

The slurry that includes the composite hydroxide that was generated and grown in the reaction process is continuously extracted from the reaction vessel, and classified by a separation apparatus into particles that have reached the target particle size (hereafter, referred to as the "large particle size portion") and underdeveloped particles that have not reached the target particle size (hereafter, referred to as the "small particle size portion"). The large particle size portion is discharged from the separation apparatus to outside the reaction vessel, and the small particle size portion is returned to inside the reaction vessel by a reflux apparatus. The particles that are returned to inside the reaction vessel are again grown inside the reaction vessel, after which the particles are led from inside the reaction vessel to the separation apparatus, and when they are determined to have reached the target particle size, are discharged to outside the reaction vessel. By repeating this process, the large particle size portion that was generated and grown inside the reaction vessel is selectively discharged to outside the reaction vessel, and the small particle size portion repeatedly undergo particle growth until they reach the target particle size, so the particle size of the composite hydroxide that is finally obtained can become uniform, and the particle size distribution can become sharp.

Particularly, in the present invention, from the aspect of improving the cycling characteristics of a secondary battery, it is necessary to perform classification so that the relationships $(D50-D10)/D50 \leq 0.30$ and $(D90-D50)/D50 \leq 0.30$ are satisfied among D10, D50 and D90 of the obtained composite hydroxide. Here, when simultaneously performing classification in the reaction process as in the technology disclosed in JP H10-265225 (A) and JP 2003-086182 (A), the crystallization conditions must be strictly managed, and application to production on an industrial scale is difficult. Moreover, there is a possibility that underdeveloped particles will be mixed with the particles of the target particle size, making it difficult to obtain a composite hydroxide for which the relationships above are satisfied. On the other hand, in the present invention, the reaction process and the separation process are completely separated, so it is possible to easily obtain a composite hydroxide for which the relationships above are satisfied.

Preferably, a wet classification method is employed for classifying the composite hydroxide. In a dry classification method, fine particles are generated due to collisions between particles, so it becomes easy for the particle size distribution to spread, and there is a possibility that the particle shape will deform and that the tap density will decrease.

The wet classification method is not particularly limited, however, a method that uses centrifugal force, and more specifically, employing a wet cyclone method is preferred. With a wet cyclone method, it is possible to easily control the classification points according to the shape, and size of the cyclone and the inlet pressure of the processing slurry. For example, in order to perform classification so that the spherical composite hydroxide that was grown to an average particle size of 10 μm to 30 μm in the reaction process satisfies the relationships $(D50-D10)/D50 \leq 0.30$ and $(D90-D50)/D50 \leq 0.30$, preferably the cyclone has a cylindrical shape, and the inlet pressure of the processing slurry is adjusted to be within the range 0.3 MPa to 0.5 MPa.

(2-3) Reflux Process

The reflux process is a process for returning the slurry that includes the small particle size portion that was discharged from the separation apparatus (hereafter, referred to as "small particle size portion slurry") to the reaction vessel. The reflux method is not particularly limited, and it is possible to use a known method. For example, when returning the small particle size portion after classification to the reaction vessel as is, the small particle size portion slurry that was discharged from the separation apparatus can be directly returned to the reaction vessel by a pump. On the other hand, when it is necessary to adjust the concentration of the small particle size portion slurry, it is necessary to provide separate concentrating means or diluting means.

The reflux speed, or in other words the speed at which the small particle size portion is returned to the reaction vessel should be appropriately adjusted according to the supply speed for the raw material aqueous solution or aqueous solution that includes the ammonium ion donor.

With the production method of the present invention described above, it is possible to easily obtain a composite hydroxide that has suitable structure and particle size distribution and that can be used as a precursor for a cathode active material for a non-aqueous electrolyte secondary battery.

(3) Production Device for a Nickel-Cobalt Composite Hydroxide

Figure 3:
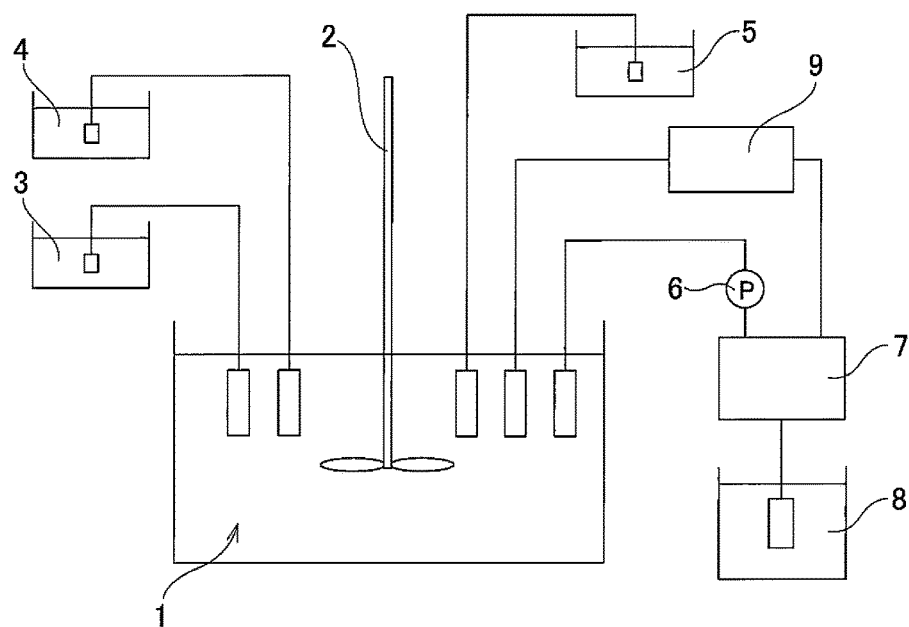
FIG. 3 is a concept diagram illustrating a production device for producing the nickel-cobalt hydroxide of the present invention.

The production device for producing the composite hydroxide of the present invention, as illustrated in FIG. 3, includes: a reaction vessel (1) that obtains the composite hydroxide by continuously supplying a raw material aqueous solution, ammonium ion supply aqueous solution and caustic alkali aqueous solution to the reaction vessel while mixing, and causing these to react; a separation apparatus (7) that continuously extracts composite hydroxide from the reaction vessel (1), and by performing classification, separates the composite hydroxide into a large particle size portion and a small particle size portion; and a reflux apparatus (9) that continuously returns the small particle size portion to the reaction vessel.

(Reaction Vessel)

The reaction vessel (1) that is used in the reaction process includes mixing means (2), raw material aqueous solution supply means (3), ammonium ion supply aqueous solution supply means (4) and caustic alkali aqueous solution supply means (5), and can continuously discharge generated composite hydroxide; and this reaction vessel is not particularly limited as long as the vessel is an overflow vessel. However, in order to control the crystallization conditions, preferably the reaction vessel further includes temperature control means and pH control means. The mixing means (2) should be appropriately selected so as to be suitable for production on an industrial scale; for example a known magnetic stirrer, mechanical stirrer and the like can be used. Moreover, suitable and known devices can be employed as the temperature control means, pH control means and supply means for the raw material aqueous solution and the like.

(Separation Apparatus)

The slurry that is generated in the reaction process is input to the separation apparatus (7) by a pump (6). When doing this, preferably a wet separation apparatus is used as the separation apparatus (7), and even more preferably a separation apparatus that uses a wet cyclone method is used. In the case of a separation apparatus that uses a wet cyclone method, it is possible to easily control the classification points according to the shape and size of the cyclone, and by the inlet pressure of the processing slurry.

(Reflux Apparatus)

The large particle size portion that was separated out in the separation process is discharged to the outside of the reaction vessel. On the other hand, the small particle size portion is returned to the reaction vessel by the reflux apparatus (9).

The reflux apparatus (9) is not particularly limited, and a known apparatus can be used. For example, when performing simple reflux, the small particle size portion slurry that was discharged from the separation apparatus should be directly returned to the reaction vessel by a pump. However, when necessary, it is also possible to combine a diluting apparatus or dehydrating apparatus for adjusting the slurry concentration of the small particle size portion slurry that was obtained in the separation process.

When separating the small particle size portion and large particle size portion, the liquid component is normally distributed more on the small particle size portion side, so before returning the small particle size portion to the reaction vessel, it is necessary to perform dehydration of the small particle size portion. When performing dehydration of the small particle size portion in this way, even when the classification point is small, using a wet cyclone dehydrating apparatus that is able to precisely perform separation into a small particle size portion and liquid component is preferred.

(Other)

Preferably there is a diluting apparatus or a dehydrating apparatus provided between the apparatuses in order to adjust the slurry concentration of the obtained composite hydroxide.

Moreover, preferably there is a receiving vessel (8) that recovers the large particle size portion that is classified by the separation apparatus, and particularly, when covering the obtained composite hydroxide with the added element M described above, preferably there is also a coating apparatus. As the coating apparatus, an apparatus that includes means for causing the added element M to precipitate out onto the surface of the composite hydroxide, and means for spraying and drying aqueous solution or slurry that includes the added element M, or means for spray drying a slurry in which salt that includes the added element M is included is suspended is preferred.

Furthermore, in the present invention, there is preferably control means such as a computer control system for controlling the reaction speed, classification speed and reflux speed in each of the processes.

2. Cathode Active Material for a Non-Aqueous Electrolyte Secondary Battery and Production Method Thereof (1) Cathode Active Material for a Non-Aqueous Electrolyte Secondary Battery The cathode active material for a non-aqueous electrolyte secondary battery of the present invention includes a lithium composite oxide having a layered hexagonal crystal structure that is expressed by the general formula: $Li_{1+u}Ni_{1-x-y}Co_xM_yO_2$ (where $0 \leq u \leq 0.30$, $0.05 \leq x \leq 0.50$, $0 \leq y \leq 0.10$, $0.05 \leq x+y \leq 0.50$, and M is at least one kind of metal element selected from among Al, Mg, Mn, Ti, Fe, Cu, Zn and Ga), and the relationships $(D50-D10)/D50 \leq 0.30$ and $(D90-D50)/D50 \leq 0.30$ are satisfied among D10, D50 and D90 of this lithium composite oxide. As will be described below, such a cathode active material can easily be obtained by using the composite hydroxide of the present invention as a precursor.

(Composition)

In the general formula above, the value of u that indicates the surplus amount of lithium is preferably 0 to 0.30, and more preferably 0 to 0.25. When the value of u is less than 0, the reaction resistance of the cathode in a non-aqueous electrolyte secondary battery that uses the obtained cathode active material becomes large, so the output of the battery decreases. On the other hand, when the value of u is greater than 0.30, the initial electrical discharge capacity when the cathode active material is used in the cathode of a battery not only decreases, but the reaction resistance of the cathode increases.

The value of x that indicates the added amount of cobalt and the value of y that indicates the amount added element M that is included are the same as the values of the composite hydroxide described above, so an explanation here is omitted.

(Particle Size Distribution)

The cathode active material of the present invention is such that the relationships (D50−D10)/D50≤0.30 and (D90−D50)/D50≤0.30 are satisfied among D10, D50 and D90.

When the relationships above are satisfied among D10, D50 and D90, the particle size distribution of the cathode active material can be said to be very sharp, so it is possible to sufficiently improve the cycling characteristics of a non-aqueous electrolyte secondary battery that uses this cathode active material. More specifically, it becomes possible to keep the capacity maintenance rate, which is an index of the cycling characteristics of a non-aqueous electrolyte secondary battery, at 97.5% or greater.

On the other hand, when either one of the relationships (D50−D10)/D50 and (D90−D50)/D50 is greater than 0.30, the uniformity of the particle size worsens, and it becomes impossible to sufficiently improve the cycling characteristics of a non-aqueous electrolyte secondary battery that uses this cathode active material.

From the aspect of further improving the cycling characteristics of a non-aqueous electrolyte secondary battery, preferably the relationships (D50−D10)/D50≤0.27 and (D90−D50)/D50≤0.27, and even more preferably the relationships (D50−D10)/D50≤0.20 and (D90−D50)/D50≤0.20 are satisfied among D10, D50 and D90.

(Tap Density)

The tap density of the cathode active material of the present invention is preferably 2.0 g/cm$^3$ or greater, and more preferably 2.2 g/cm$^3$ or greater. When the tap density of the cathode active material is within such a range, it is possible to obtain even better battery properties of a non-aqueous electrolyte secondary battery that uses this cathode active material. On the other hand, when the tap density is less than 2.0 g/cm$^3$, the packing density of the cathode active material is not sufficient, and it may not be possible to sufficiently improve the properties of a non-aqueous electrolyte secondary battery.

(Average Particle Size)

The average particles size of the cathode active material of the present invention is preferably within the range 10 μm to 30 μm, and more preferably within the range 13 μm to 26 μm, and even more preferably within the range 15 μm to 25 μm. When the average particle size of the cathode active material is within such a range, it is possible to obtain even better battery properties of a non-aqueous electrolyte secondary battery that uses this cathode active material. Particularly, by controlling the tap density within the range above, and controlling the average particle size within this kind of range, it is possible to make the capacity maintenance rate preferably 98.0% or greater, and more preferably 98.5% or greater.

When the average particle size is less than 10 μm, the packing density of the cathode active material is not sufficient, and it may not be possible to sufficiently improve the properties of a non-aqueous electrolyte secondary battery. On the other hand, when the average particle size is greater than 30 μm, the specific surface area of the cathode active material decreases, and similarly, it may not be possible to sufficiently improve the properties of a non-aqueous electrolyte secondary battery.

(2) Method for Producing a Cathode Active Material for a Non-Aqueous Electrolyte Secondary Battery In the following, a method for producing a cathode active material for a non-aqueous electrolyte secondary battery that uses the nickel composite hydroxide described above as a precursor will be explained.

(Mixing Process)

The mixing process is a process for obtaining a lithium mixture by mixing together the composite hydroxide and lithium compound.

The lithium compound that is used when doing this is not particularly limited, and for example, it is possible to use lithium hydroxide, lithium nitrate, lithium carbonate, or a mixture of these. Particularly, when considering ease of handling and stability of product quality, preferably lithium hydroxide or lithium carbonate is used.

The composite hydroxide and lithium compound are mixed so that the ratio of the number of atoms of metals other than lithium inside the lithium mixture, or in other words, the sum of the number of atoms of nickel, cobalt and added element M (Me), and the number of atoms of lithium (Li) (Li/Me) is preferably 1.00 to 1.30, or more preferably 1.00 to 1.15. In other words, the ratio Li/Me does not change before or after the calcination process, so the ratio Li/Me of mixing during this mixing process becomes the ratio Li/Me of the cathode active material, and thus mixing is performed so that Li/Me becomes the same as the Li/Me of the cathode active material to be obtained.

For mixing the composite hydroxide and lithium compound, it is possible to use a typical mixer; for example, a shaker mixer, Loepige mixer, Julia mixer, V blender and the like can be used. Mixing must be sufficiently performed, however the structure of the composite hydroxide should not be broken down.

(Roasting Process)

Before the mixing process, there is preferably a roasting process in which the composite hydroxide is roasted beforehand in an oxidizing atmosphere at a temperature of 300° C. to 700° C. With this kind of roasting process, it is possible to change the composite hydroxide to a nickel-cobalt oxide (hereafter, referred to as "composite oxide"), and when this composite oxide is mixed with the lithium compound, it is possible to stabilize the composition ratio of the lithium inside the lithium metal elements in the composite oxide while maintaining the packing ability of the lithium composite oxide.

The roasting temperature is preferably 300° C. to 700° C., and more preferably 400° C. to 600° C. When the roasting temperature is less than 300° C., there is a possibility that part of the composite hydroxide will remain, and thus the composition of the obtained lithium composite oxide may not become stable. On the other hand, when the roasting temperature is greater than 700° C., sintering occurs among the particles and coarse particles are generated, so there is a possibility that the particle size distribution will worsen.

(Calcination Process)

The calcination process is a process of performing calcination of the lithium compound that was obtained in the mixing process in an oxidizing atmosphere at a temperature of 600° C. to 850° C.

The calcination temperature in the calcination process is preferably 600° C. to 850° C., and more preferably 700° C. to 800° C. When the calcination temperature is less than 600° C., the diffusion reaction speed of the lithium is not sufficient, so surplus lithium remains, the crystal structure becomes irregular, and when used in a battery, sufficient properties are not obtained. On the other hand, when the calcination temperature is greater than 850° C., severe sintering occurs between particles of the lithium composite oxide, and there is a possibility that abnormal particle growth will occur. In that case, the particles after calcination become coarse, and it is not possible to maintain a spherical particle shape. Such cathode active material has reduced specific surface area, so when used in a battery, the resistance of the cathode increases, and the battery capacity decreases.

From the aspect of uniformly performing a reaction between the composite hydroxide or composite oxide and the lithium compound, preferably the speed of the rise in temperature is 1° C./min to 2.5° C./min until the temperature above is reached. Furthermore, by maintaining the temperature at a temperature near the melting point of the lithium compound for 1 to 5 hours, it is possible to perform the reaction more uniformly.

The amount of time during which the calcination temperature is maintained is preferably 5 hours or more, and more preferably 5 hours to 10 hours. When the amount of time during which the calcination temperature is maintained is less than 5 hours, synthesizing of the lithium composite oxide may not be sufficiently performed.

Moreover, the atmosphere during calcination is preferably an oxidizing atmosphere. More specifically, the atmosphere preferably has an oxygen concentration of 18% by volume to 100% by volume, and more preferably is an atmosphere that has an oxygen concentration of 70% by volume to 100% by volume, and even more preferably is a mixed atmosphere of oxygen having the oxygen concentration above and an inert gas. When the oxygen concentration is less than 18% by volume, the crystallinity of the lithium compound may be insufficient.

The furnace used in calcination is not particularly limited, and any furnace can be used as long as the furnace is capable of heating a non-aqueous electrolyte lithium mixture in an oxidizing atmosphere, however, from the aspect of maintaining a uniform atmosphere inside the furnace, an electric furnace that does not generate gas is preferred, and it is possible to use either a batch furnace or continuous furnace.

3. Non-Aqueous Electrolyte Secondary Battery

The non-aqueous electrolyte secondary battery of the present invention includes the same elements as a typical non-aqueous electrolyte secondary battery such as a cathode, an anode, a separator, a non-aqueous electrolyte and the like. The embodiment that will be explained below is only an example, and the non-aqueous electrolyte secondary battery of the present invention can undergo various changes and modifications based on the embodiment disclosed in this specification.

(1) Cathode

The cathode of a non-aqueous electrolyte secondary battery is made as described below, for example, using the cathode active material for a non-aqueous electrolyte secondary battery that is obtained according to the present invention.

First, a cathode mixture paste is made by mixing a conductive material and a binding agent with the powdered cathode active material that was obtained according to the present invention, and then further adding an activated carbon and a solvent such as a viscosity controller and the like as necessary. When doing this, the mixture ratios inside the cathode mixture paste are also important elements for setting the performance of the non-aqueous electrolyte secondary battery. When the solid part of the cathode mixture without the solvent is taken to be 100 parts by mass, then preferably the mass of the cathode active material is 60 to 95 parts by mass, the mass of the conductive material is 1 to 20 parts by mass, and the mass of the binding agent is 1 to 20 parts by mass.

The obtained cathode paste is coated on the surface of an aluminum foil current collector, then dried to disperse the solvent. When necessary, pressure may be applied by a roll press in order to increase the electrode density. In this way, it is possible to make a sheet shaped cathode. A sheet shaped cathode can be cut to a suitable size according to the battery to be made, and used in the battery. However, the method for producing the cathode is not limited to such a method, and other methods can also be used.

As the conductive material, it is possible to use graphite (natural graphite, artificial graphite, expanded graphite, and the like), or a carbon black material such as acetylene black, Ketjen black and the like.

The binding agent serves the role of stopping bonding of particles of active material, so, for example, it is possible to use polyvinylidene fluoride (PVDF), polytetrafluoroethylene (PTFE), fluororubber, ethylene propylene diene rubber, styrene-butadiene, cellulose resin, and polyacrylic acid.

Moreover, as necessary, it is possible to disperse the cathode active material, conductive material and activated carbon, and add a solvent in which a binding agent is dissolved to the cathode mixture. More specifically, it is possible to use an organic solvent such as N-methyl-2-pyrrolidone as the solvent. Moreover, it is possible to add activated carbon in order to increase the electric double layer capacity.

(2) Anode

It is possible to use an anode that is formed by mixing a binding agent with metallic lithium or lithium alloy, or with an active anode material that is able to take in or release lithium ions, coating and drying an anode mixture that is formed into a paste by adding a suitable solvent onto to the surface of a current collector made of a metal such as copper, and when necessary, compressing the anode to increase the electrode density.

As the anode active material, it is possible to use an organic fired body such as natural graphite, artificial graphite, and phenol resin, or a powder of carbon material such as coke. In this case, as in the cathode, it is possible to use a fluorine containing resin such as PVDF as the anode binding agent, and it is possible to use an organic solvent such as N-methyl-2-pyrrolidone as the solvent for dispersing the active material and binding agent.

(3) Separator

A separator is placed between the cathode and the anode. The separator separates the cathode and anode and holds the electrolyte, and a thin film made of polyethylene, polypropylene or the like that is porous with many fine holes can be used as the separator.

(4) Non-Aqueous Electrolyte

The non-aqueous electrolyte is formed by dissolving a lithium salt as a supporting salt into an organic solvent.

As the organic solvent, it is possible to use one kind or a mixture of two or more kinds selected from among a cyclic carbonate such as ethylene carbonate, propylene carbonate, butylene carbonate, trifluoro propylene carbonate and the like, a chain carbonate such as diethyl carbonate, dimethyl carbonate, ethyl methyl carbonate, dipropyl carbonate and the like, an ether compound such as tetrahydrofuran, 2-methyltetrahydrofuran, dimethoxyethane and the like, a sulfur compound such as ethyl methyl sulfone, butane sulfone and the like, and a phosphorous compound such as triethyl phosphate, trioctyl phosphate and the like.

As the supporting salt, $LiPF_6$, $LiBF_4$, $LiClO_4$, $LiAsF_6$, $LiN(CF_3SO_2)_2$ and composite salts of these can be used.

Furthermore, the non-aqueous electrolyte can include a radical scavenger, a surfactant, a flame retardant and the like.

(5) Battery Shape and Construction

The non-aqueous electrolyte secondary battery of the present invention that is constructed using the cathode, anode, separator and non-aqueous electrolyte explained above can have various shapes such as a cylindrical shape, layered shape and the like.

In the case of any shape, the cathode and anode are layered by way of a separator and are taken to be electrodes, non-aqueous electrolyte is impregnated into the obtained electrodes, current collecting leads are used to connect the cathode current collector to a cathode terminal that passes to the outside, and to connect the anode current collector to an anode terminal that passes to the outside, and the non-aqueous electrolyte battery is completed by sealing the battery inside a battery case.

Figure 4:
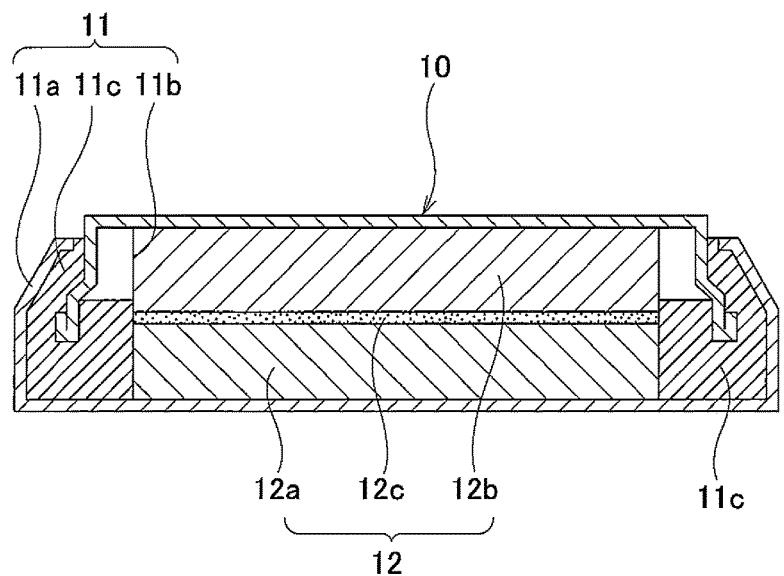
FIG. 4 is cross-sectional view of a 2032 lithium cell that was used in battery evaluation.

As an example of this kind of secondary battery is a 2032 lithium cell (10) as illustrated in FIG. 4. This 2032 lithium cell (10) includes a case (11), and an electrode (12) that is housed inside this case (11).

The case (11) includes a cathode can (11a) that is hollow and open on one end, and an anode can (11b) that is placed in the opening section of the cathode can (11a), such that when the anode can (11b) is placed in the opening section of the cathode can (11a), a space is formed between the anode can (11b) and the cathode can (11a) that houses the electrode (12).

The electrode (12) includes a cathode (12a), a separator (12c) and an anode (12b) layered in that order, and are housed inside the case (11) so that the cathode (12a) comes in contact with the inner surface of the cathode can (11a) and the anode (12b) comes in contact with the anode can (11b).

The case (11) includes a gasket (11c), and this gasket (11c) is arranged and fastened inside the case (11) so as to maintain an insulating state between the cathode can (11a) and anode can (11b). The gasket (11c) also has the function of sealing the space between the cathode can (11a) and the anode can (11b) and closing off the inside of the case (11) and the outside so as to be airtight and watertight.

(6) Characteristics

The non-aqueous electrolyte secondary battery that uses the cathode active material of the present invention is such that after constructing this non-aqueous electrolyte secondary battery and the open circuit voltage (OCV) becomes stable, with the current density with respect to the cathode being 0.5 mA/cm$^2$, and the cutoff voltage being 4.3V to 3.0V, after a charge and discharge test is performed at 25° C. for 25 cycles, the capacity maintenance rate is 97.5% or greater, and preferably 98.0% or greater, and even more preferably 98.5% or greater. In this way, the non-aqueous electrolyte secondary battery of the present invention has very excellent cycling characteristics, so it can be said to be suitable as the power source for compact portable electronic devices and electric automobiles. The present invention can be used as the power source for not only electric automobiles that are driven simply by electric energy, but also as the power source for so-called hybrid automobiles that also use a combustion engine such as a gasoline engine, diesel engine or the like.

EXAMPLES

In the following, the present invention will be explained in further detail using examples and comparative examples, however, the present invention is not limited to these examples. In the examples, unless otherwise stated, the samples used in the production of the composite hydroxide, the cathode active material and the secondary battery were special grade chemicals from Wako Pure Chemical Industries, Ltd.

Example 1

32 L of industrial water, and 1300 mL of ammonia water containing 25 mass % ammonia were poured into a 34 L capacity overflow crystallization reaction vessel to which four baffle plates were installed, that were heated by using the thermostatic bath and heating jacket to 50° C. After that, 24 mass % caustic soda aqueous solution was poured in, and control was performed so that the pH value at a standard liquid temperature of 25° C. was 12.2. More specifically, in order to accurately manage the pH value, the reaction aqueous solution inside the reaction vessel was collected, cooled to 25° C. and the pH value was measured, and the pH value at 50° C. was controlled so that the pH value at 25° C. was within the range 12.1 to 12.3.

The crystallization reaction was performed by supplying raw material aqueous solution that was adjusted to have a Ni mol concentration of 1.69 mol/L, and Co mol concentration of 0.31 mol/L using a constant volume pump while mixing inside the reaction vessel that was maintained at 50° C., supplying 25 mass % ammonia water at a rate of 2.5 mL/min, and intermittently adding 24 mass % caustic soda aqueous solution to perform control so that the pH value was maintained at 12.2 at a standard liquid temperature of 25° C. The mixing that was performed here was performed using a three propeller blades (inclination angle of 30°) having a diameter of 10 cm, and a mixing speed of 1200 rpm. The supply of the raw material aqueous solution was performed by inserting a supply nozzle into the reaction aqueous solution and directly supplying the raw material aqueous solution.

After that, the slurry that was generated in the reaction process was extracted by a constant volume pump by way of an extraction nozzle that was inserted into the reaction vessel, and after the slurry concentration was adjusted to 150 g/L, the slurry inlet pressure was adjusted to be within the range 0.3 MPa to 0.5 MPa, and input into a wet cyclone separation apparatus (Hydrocyclone NHC-10, manufactured by Japan Chemical Engineering & Machinery Co. Ltd.). The wet cyclone separation apparatus that was used at this time had a cylindrical cyclone section and a cross-sectional diameter of 5 mm to 10 mm.

In the separation process, particles that reached a particle size of 15 μm were continuously discharged as a large particle size portion, and collected and stored in a receiving vessel. On the other hand, particles that had not yet reached a particle size of 15 μm were continuously returned to the reaction vessel as a small particle size portion by using a wet cyclone dehydration apparatus (continuous dehydrator, manufactured by Japan Chemical Engineering & Machinery Co. Ltd.) after the separation process, and after adjusting the slurry concentration to 150 g/L, inputting the particles to a reflux apparatus.

48 to 72 hours after the start of the reaction, the obtained composite hydroxide was suitably separated into a solid and liquid component, and after drying, a powdered composite hydroxide was obtained. This composite hydroxide, as a result of ICP-atomic emission spectrometry, was confirmed to be expressed by the general formula: $Ni_{0.85}Co_{0.15}(OH)_2$. Moreover, the particle size distribution (D10, D50, D90) of this composite hydroxide was measured using a laser diffraction scattering particle size and particle size distribution meter (Microtrac, manufactured by Nikkiso Co., Ltd.). Furthermore, the tap density was measured using a tap density measurement apparatus (shaking specific gravity measurement device (tapping machine) KRS-409, manufactured by Japan Scientific Instruments Association). These results are given in Table 1.

After that, the composite hydroxide was dispersed into an aqueous solution in which sodium hydroxide (NaOH) and sodium aluminate (NaAlO$_2$) were dissolved and neutralized with a sulfuric acid aqueous solution (H$_2$SO$_4$) while stirring, to obtain a slurry that includes a composite hydroxide with aluminum hydroxide precipitated out on the surface thereof. This slurry was then washed, filtered and dried at approximately 100° C., then by heating the slurry to 700° C., and roasting, a composite oxide was formed that was coated with aluminum. This composite oxide, as a result of ICP-atomic emission spectrometry, was confirmed to be expressed by the general formula: Ni$_{0.83}$Co$_{0.13}$Al$_{0.04}$O$_2$.

Furthermore, lithium hydroxide (LiOH) was mixed into the obtained composite oxide as a lithium (Li) supply source, and the lithium mixture was adjusted so that the ratio of the number of lithium atoms (Li) and the sum of the number of atoms (Me) of the metal elements (Ni, Co, Al) of the composite oxide (Li/Me) became 1.05. After that, this lithium mixture was heated in an oxidizing atmosphere from room temperature to a temperature range of 700° C. to 800° C., and by performing calcination for approximately 7 hours in that temperature range, a lithium composite oxide (cathode active material) was obtained. This cathode active material, as a result of ICP-atomic emission spectrometry, was confirmed to be expressed by the general formula: Li$_{1.05}$Ni$_{0.83}$Co$_{0.13}$Al$_{0.04}$O$_2$. Moreover, the particle size distribution of this cathode active material was measured using a laser diffraction scattering particle size and particle size distribution meter, and the tap density was measured using a tap density measurement apparatus. Furthermore, this cathode active material was analyzed using X-ray diffraction, and was confirmed to have a layered hexagonal crystal structure. In this analysis, the lithium occupancy rate that was found using Rietveld analysis from an X-ray diffraction chart was confirmed to be 98.2% to 98.9%.

In order to evaluate the cathode active material that was obtained in this way, a 2032 lithium cell (10) such as illustrated in FIG. 4 was made as described below and used. First, acetylene black 5 mass %, and PVDF (polyvinylidene fluoride) 5 mass % were mixed into the obtained cathode active material powder 90 mass %, then NMP (N-methylpyrrolidone) was added to make a paste. This paste was coated onto 20 μm thick aluminum foil and dried at 120° C. in a vacuum so that the mass of the cathode active material after drying became 0.05 g/cm$^2$, after which a cathode (12a) was formed by punching out a 1 cm diameter circular plate. This cathode (12a), an anode (12b), a separator (12c) and electrolyte were used to make a lithium cell (10) in a glove box in an argon (Ar) atmosphere for which the dew point was controlled to be −80° C. or less. When doing this, lithium metal was used for the anode (12b), porous polyethylene film having a film thickness of 25 μm was used as the separator (12c), and a mixed solution of equal parts of ethylene carbonate (EC) and diethyl carbonate (DEC) with IM of lithium perchlorate (LiClO$_4$) as a supporting salt was used as the electrolyte. The obtained lithium cell (10) was left for about 24 hours, and after the open circuit voltage (OCV) became stable, electric charge and discharge testing was performed at 25° C. with the current density with respect to the cathode taken to be 0.5 mA/cm$^2$, and the cutoff voltage taken to be 4.3 V to 3.0 V. Electric charge and discharge were repeated, and the capacity maintenance rate after 25 cycles was measured. These results are given in Table 2.

Example 2

Except for the pH value of the reaction aqueous solution being maintained at 11.8 at a standard liquid temperature of 25° C., and the mixing speed in the reaction process, a composite hydroxide was obtained in the same way as in Example 1. Management of the pH value was performed by extracting reaction aqueous solution from the reaction vessel, cooling to 25° C., and measuring the pH value, and the pH value at 50° C. was control such that the pH value at 25° C. was within the range 11.7 to 11.9. The obtained composite hydroxide was suitably separated into a solid and liquid component, and after drying, a powdered composite hydroxide was obtained. This composite hydroxide, as a result of ICP-atomic emission spectrometry, was confirmed to be expressed by the general formula: Ni$_{0.85}$Co$_{0.15}$(OH)$_2$. Moreover, the particle size distribution (D10, D50, D90) and tap density of this composite hydroxide were measured in the same way as for Example 1. The results are given in Table 1.

After that, as in the case of Example 1, a composite oxide was formed that was coated with aluminum. This composite oxide, as a result of ICP-atomic emission spectrometry, was confirmed to be expressed by the general formula: Ni$_{0.83}$Co$_{0.13}$Al$_{0.04}$O$_2$.

Furthermore, as in Example 1, a cathode active material was obtained. This cathode active material, as a result of ICP-atomic emission spectrometry, was confirmed to be expressed by the general formula: Li$_{1.05}$Ni$_{0.83}$Co$_{0.13}$Al$_{0.04}$O$_2$. Moreover, the particle size distribution of this cathode active material was measured using a laser diffraction scattering particle size and particle size distribution meter, and the tap density was measured using a tap density measurement apparatus.

Finally, a 2032 lithium cell was made as in Example 1 using this cathode active material, and by performing an electric charge and discharge test, the ON capacity maintenance rate after 25 cycles was measured. These results are given in Table 2.

Example 3

Except for maintaining the pH value of the reaction aqueous solution at 12.0 at a standard liquid temperature of 25° C., a composite hydroxide was obtained in the same way as in Example 1. This composite hydroxide, as a result of ICP-atomic emission spectrometry, was confirmed to be expressed by the general formula: Ni$_{0.85}$Co$_{0.15}$(OH)$_2$. Moreover, the particle size distribution (D10, D50, D90) and tap density of this composite hydroxide were measured in the same way as for Example 1. The results are given in Table 1.

After that, as in the case of Example 1, a composite oxide was formed that was coated with aluminum. This composite oxide, as a result of ICP-atomic emission spectrometry, was confirmed to be expressed by the general formula: Ni$_{0.83}$Co$_{0.13}$Al$_{0.04}$O$_2$.

Furthermore, as in Example 1, a cathode active material was obtained. This cathode active material, as a result of ICP-atomic emission spectrometry, was confirmed to be expressed by the general formula:

$Li_{1.05}Ni_{0.83}Co_{0.13}Al_{0.04}O_2$. Moreover, the particle size distribution of this cathode active material was measured using a laser diffraction scattering particle size and particle size distribution meter, and the tap density was measured using a tap density measurement apparatus.

Finally, a 2032 lithium cell was made as in Example 1 using this cathode active material, and by performing an electric charge and discharge test, the capacity maintenance rate after 25 cycles was measured. These results are given in Table 2.

Example 4

Except for maintaining the temperature of the reaction aqueous solution at 35° C., a composite hydroxide was obtained in the same way as in Example 1. This composite hydroxide, as a result of ICP-atomic emission spectrometry, was confirmed to be expressed by the general formula: $Ni_{0.85}Co_{0.15}(OH)_2$. Moreover, the particle size distribution (D10, D50, D90) and tap density of this composite hydroxide were measured in the same way as for Example 1. The results are given in Table 1.

After that, as in the case of Example 1, a composite oxide was formed that was coated with aluminum. This composite oxide, as a result of ICP-atomic emission spectrometry, was confirmed to be expressed by the general formula: $Ni_{0.83}Co_{0.13}Al_{0.04}O_2$.

Furthermore, as in Example 1, a cathode active material was obtained. This cathode active material, as a result of ICP-atomic emission spectrometry, was confirmed to be expressed by the general formula: $Li_{1.05}Ni_{0.83}Co_{0.13}Al_{0.04}O_2$. Moreover, the particle size distribution of this cathode active material was measured using a laser diffraction scattering particle size and particle size distribution meter, and the tap density was measured using a tap density measurement apparatus.

Finally, a 2032 lithium cell was made as in Example 1 using this cathode active material, and by performing an electric charge and discharge test, the capacity maintenance rate after 25 cycles was measured. These results are given in Table 2.

Example 5

Except for using a raw material aqueous solution that had been adjusted so that the Ni mol concentration was 1.66 mol/L, the Co mol concentration was 0.26 mol/L and the Al mol concentration was 0.08 mol/L, a composite hydroxide was obtained in the same way as in Example 1. This composite hydroxide, as a result of ICP-atomic emission spectrometry, was confirmed to be expressed by the general formula: $Ni_{0.83}Co_{0.13}Al_{0.04}(OH)_2$. Moreover, the particle size distribution (D10, D50, D90) and tap density of this composite hydroxide were measured in the same way as for Example 1. The results are given in Table 1.

Lithium hydroxide was mixed into this composite hydroxide so that the Li/Me ratio became 1.05, then calcination was performed under the same conditions as in Example 1 to obtain a cathode active material. This cathode active material, as a result of ICP-atomic emission spectrometry, was confirmed to be expressed by the general formula: $Li_{1.05}Ni_{0.83}Co_{0.13}Al_{0.04}O_2$. Moreover, the particle size distribution of this cathode active material was measured using a laser diffraction scattering particle size and particle size distribution meter, and the tap density was measured using a tap density measurement apparatus.

Finally, a 2032 lithium cell was made as in Example 1 using this cathode active material, and by performing an electric charge and discharge test, the capacity maintenance rate after 25 cycles was measured. These results are given in Table 2.

Example 6

Except for using a raw material aqueous solution that had been adjusted so that the Ni mol concentration was 1.66 mol/L, the Co mol concentration was 0.26 mol/L and the Mg mol concentration was 0.08, a composite hydroxide was obtained in the same way as in Example 5. When doing this, magnesium sulfate was used as the magnesium source. This composite hydroxide, as a result of ICP-atomic emission spectrometry, was confirmed to be expressed by the general formula: $Ni_{0.83}Co_{0.13}Mg_{0.04}(OH)_2$. Moreover, the particle size distribution (D10, D50, D90) and tap density of this composite hydroxide were measured in the same way as for Example 1. The results are given in Table 1.

Lithium hydroxide was mixed into this composite hydroxide so that the Li/Me ratio became 1.05, then calcination was performed under the same conditions as in Example 1 to obtain a cathode active material. This cathode active material, as a result of ICP-atomic emission spectrometry, was confirmed to be expressed by the general formula: $Li_{1.05}Ni_{0.83}Co_{0.13}Mg_{0.04}O_2$. Moreover, the particle size distribution of this cathode active material was measured using a laser diffraction scattering particle size and particle size distribution meter, and the tap density was measured using a tap density measurement apparatus.

Finally, a 2032 lithium cell was made as in Example 1 using this cathode active material, and by performing an electric charge and discharge test, the capacity maintenance rate after 25 cycles was measured. These results are given in Table 2.

Example 7

Calcination was performed on a composite hydroxide that was obtained in the same way as in Example 1 without a coating, and a composite oxide was obtained. This composite hydroxide, as a result of ICP-atomic emission spectrometry, was confirmed to be expressed by the general formula: $Ni_{0.86}Co_{0.14}(OH)_2$. Moreover, the particle size distribution (D10, D50, D90) and tap density of this composite hydroxide were measured in the same was as for Example 1. The results are given in Table 1.

Lithium hydroxide was mixed into this composite hydroxide so that the Li/Me ratio became 1.05, then calcination was performed under the same conditions as in Example 1 to obtain a cathode active material. This cathode active material, as a result of ICP-atomic emission spectrometry, was confirmed to be expressed by the general formula: $Li_{1.05}Ni_{0.86}Co_{0.14}O_2$. Moreover, the particle size distribution of this cathode active material was measured using a laser diffraction scattering particle size and particle size distribution meter, and the tap density was measured using a tap density measurement apparatus.

Finally, a 2032 lithium cell was made as in Example 1 using this cathode active material, and by performing an electric charge and discharge test, the capacity maintenance rate after 25 cycles was measured. These results are given in Table 2.

Example 8

Except for the pH value of the reaction aqueous solution being maintained at 11.6 at a standard liquid temperature of 25° C., a composite hydroxide was obtained in the same way as in Example 1. This composite hydroxide, as a result of ICP-atomic emission spectrometry, was confirmed to be expressed by the general formula: $Ni_{0.85}Co_{0.15}(OH)_2$. Moreover, the particle size distribution (D10, D50, D90) and tap density of this composite hydroxide were measured in the same way as for Example 1. The results are given in Table 1.

After that, as in the case of Example 1, a composite oxide was formed that was coated with aluminum. This composite oxide, as a result of ICP-atomic emission spectrometry, was confirmed to be expressed by the general formula: $Ni_{0.83}Co_{0.13}Al_{0.04}O_2$.

Furthermore, as in Example 1, a cathode active material was obtained. This cathode active material, as a result of ICP-atomic emission spectrometry, was confirmed to be expressed by the general formula: $Li_{1.05}Ni_{0.83}Co_{0.13}Al_{0.04}O_2$. Moreover, the particle size distribution of this cathode active material was measured using a laser diffraction scattering particle size and particle size distribution meter, and the tap density was measured using a tap density measurement apparatus.

Finally, a 2032 lithium cell was made as in Example 1 using this cathode active material, and by performing an electric charge and discharge test, the capacity maintenance rate after 25 cycles was measured. These results are given in Table 2.

Example 9

Except for the liquid temperature inside the reaction vessel being maintained at 25° C., a composite hydroxide was obtained in the same way as in Example 1. This composite hydroxide, as a result of ICP-atomic emission spectrometry, was confirmed to be expressed by the general formula: $Ni_{0.85}Co_{0.15}(OH)_2$. Moreover, the particle size distribution (D10, D50, D90) and tap density of this composite hydroxide were measured in the same way as for Example 1. The results are given in Table 1.

After that, as in the case of Example 1, a composite oxide was formed that was coated with aluminum. This composite oxide, as a result of ICP-atomic emission spectrometry, was confirmed to be expressed by the general formula: $Ni_{0.83}Co_{0.13}Al_{0.04}O_2$.

Furthermore, as in Example 1, a cathode active material was obtained. This cathode active material, as a result of ICP-atomic emission spectrometry, was confirmed to be expressed by the general formula: $Li_{1.05}Ni_{0.83}Co_{0.13}Al_{0.04}O_2$. Moreover, the particle size distribution of this cathode active material was measured using a laser diffraction scattering particle size and particle size distribution meter, and the tap density was measured using a tap density measurement apparatus.

Finally, a 2032 lithium cell was made as in Example 1 using this cathode active material, and by performing an electric charge and discharge test, the capacity maintenance rate after 25 cycles was measured. These results are given in Table 2.

Example 10

Except for returning the small particle size portion slurry that was obtained in the separation process without adjusting the concentration of the slurry, a composite hydroxide was obtained in the same way as in Example 1. This composite hydroxide, as a result of ICP-atomic emission spectrometry, was confirmed to be expressed by the general formula: $Ni_{0.85}Co_{0.15}(OH)_2$. Moreover, the particle size distribution (D10, D50, D90) and tap density of this composite hydroxide were measured in the same way as for Example 1. The results are given in Table 1.

After that, as in the case of Example 1, a composite oxide was formed that was coated with aluminum. This composite oxide, as a result of ICP-atomic emission spectrometry, was confirmed to be expressed by the general formula: $Ni_{0.83}Co_{0.13}Al_{0.04}O_2$.

Furthermore, as in Example 1, a cathode active material was obtained. This cathode active material, as a result of ICP-atomic emission spectrometry, was confirmed to be expressed by the general formula: $Li_{1.05}Ni_{0.83}Co_{0.13}Al_{0.04}O_2$. Moreover, the particle size distribution of this cathode active material was measured using a laser diffraction scattering particle size and particle size distribution meter, and the tap density was measured using a tap density measurement apparatus.

Finally, a 2032 lithium cell was made as in Example 1 using this cathode active material, and by performing an electric charge and discharge test, the capacity maintenance rate after 25 cycles was measured. These results are given in Table 2.

Example 11

Except for setting the mixing speed to 600 rpm, a composite hydroxide was obtained in the same way as in Example 1. This composite hydroxide, as a result of ICP-atomic emission spectrometry, was confirmed to be expressed by the general formula: $Ni_{0.85}Co_{0.15}(OH)_2$. Moreover, the particle size distribution (D10, D50, D90) and tap density of this composite hydroxide were measured in the same way as for Example 1. The results are given in Table 1.

After that, as in the case of Example 1, a composite oxide was formed that was coated with aluminum. This composite oxide, as a result of ICP-atomic emission spectrometry, was confirmed to be expressed by the general formula: $Ni_{0.83}Co_{0.13}Al_{0.04}O_2$.

Furthermore, as in Example 1, a cathode active material was obtained. This cathode active material, as a result of ICP-atomic emission spectrometry, was confirmed to be expressed by the general formula: $Li_{1.05}Ni_{0.83}Co_{0.13}Al_{0.04}O_2$. Moreover, the particle size distribution of this cathode active material was measured using a laser diffraction scattering particle size and particle size distribution meter, and the tap density was measured using a tap density measurement apparatus.

Finally, a 2032 lithium cell was made as in Example 1 using this cathode active material, and by performing an electric charge and discharge test, the capacity maintenance rate after 25 cycles was measured. These results are given in Table 2.

Example 12

Except for setting the mixing speed to 1000 rpm, a composite hydroxide was obtained in the same way as in Example 1. This composite hydroxide, as a result of ICP-atomic emission spectrometry, was confirmed to be expressed by the general formula: $Ni_{0.85}Co_{0.15}(OH)_2$. Moreover, the particle size distribution (D10, D50, D90) and tap density of this composite hydroxide were measured in the same way as for Example 1. The results are given in Table 1.

After that, as in the case of Example 1, a composite oxide was formed that was coated with aluminum. This composite oxide, as a result of ICP-atomic emission spectrometry, was confirmed to be expressed by the general formula: $Ni_{0.83}Co_{0.13}Al_{0.04}O_2$.

Furthermore, as in Example 1, a cathode active material was obtained. This cathode active material, as a result of ICP-atomic emission spectrometry, was confirmed to be expressed by the general formula: $Li_{1.05}Ni_{0.83}Co_{0.13}Al_{0.04}O_2$. Moreover, the particle size distribution of this cathode active material was measured using a laser diffraction scattering particle size and particle size distribution meter, and the tap density was measured using a tap density measurement apparatus.

Finally, a 2032 lithium cell was made as in Example 1 using this cathode active material, and by performing an electric charge and discharge test, the capacity maintenance rate after 25 cycles was measured. These results are given in Table 2.

Comparative Example 1

Except for not performing a separation process, a crystallization reaction was performed in the same way as in Example 1. The amount of raw material aqueous solution, ammonia water and caustic soda aqueous solution that is supplied was adjusted so as to be equal to the amount of slurry extracted. After 48 hours to 72 hours had elapsed after the start of the reaction, the obtained composite hydroxide was suitably separated into a solid component and liquid component, and by washing and drying a composite hydroxide was obtained. This composite hydroxide, as a result of ICP-atomic emission spectrometry, was confirmed to be expressed by the general formula: $Ni_{0.86}Co_{0.14}(OH)_2$. Moreover, the particle size distribution (D10, D50, D90) and tap density of this composite hydroxide were measured in the same way as for Example 1. The results are given in Table 1.

After that, as in the case of Example 1, a composite oxide was formed that was coated with aluminum. This composite oxide, as a result of ICP-atomic emission spectrometry, was confirmed to be expressed by the general formula: $Ni_{0.83}Co_{0.13}Al_{0.04}O_2$.

Furthermore, as in Example 1, a cathode active material was obtained. This cathode active material, as a result of ICP-atomic emission spectrometry, was confirmed to be expressed by the general formula: $Li_{1.05}Ni_{0.83}Co_{0.13}Al_{0.04}O_2$. Moreover, the particle size distribution of this cathode active material was measured using a laser diffraction scattering particle size and particle size distribution meter, and the tap density was measured using a tap density measurement apparatus.

Finally, a 2032 lithium cell was made as in Example 1 using this cathode active material, and by performing an electric charge and discharge test, the capacity maintenance rate after 25 cycles was measured. These results are given in Table 2.

Comparative Example 2

Except for not performing a separation process, a crystallization reaction was performed in the same way as in Example 2. The amount of raw material aqueous solution, ammonia water and caustic soda aqueous solution that is supplied was adjusted so as to be equal to the amount of slurry extracted. After 48 hours to 72 hours had elapsed after the start of the reaction, the obtained composite hydroxide was suitably separated into a solid component and liquid component, and by washing and drying a composite hydroxide was obtained. This composite hydroxide, as a result of ICP-atomic emission spectrometry, was confirmed to be expressed by the general formula: $Ni_{0.86}Co_{0.14}(OH)_2$. Moreover, the particle size distribution (D10, D50, D90) and tap density of this composite hydroxide were measured in the same way as for Example 1. The results are given in Table 1.

After that, as in the case of Example 1, a composite oxide was formed that was coated with aluminum. This composite oxide, as a result of ICP-atomic emission spectrometry, was confirmed to be expressed by the general formula: $Ni_{0.83}Co_{0.13}Al_{0.04}O_2$.

Furthermore, as in Example 1, a cathode active material was obtained. This cathode active material, as a result of ICP-atomic emission spectrometry, was confirmed to be expressed by the general formula: $Li_{1.05}Ni_{0.83}Co_{0.13}Al_{0.04}O_2$. Moreover, the particle size distribution of this cathode active material was measured using a laser diffraction scattering particle size and particle size distribution meter, and the tap density was measured using a tap density measurement apparatus.

Finally, a 2032 lithium cell was made as in Example 1 using this cathode active material, and by performing an electric charge and discharge test, the capacity maintenance rate after 25 cycles was measured. These results are given in Table 2.

TABLE 1

| | Production Conditions for Compound Hydroxide | | | | | Compound Hydroxide | | | | | |
|---|---|---|---|---|---|---|---|---|---|---|---|
| | Separation process | Added element(s) | pH value | Temperature (° C.) | Mixing (rpm) | D10 Particle size (μm) | D50 Particle size (μm) | D90 Particle size (μm) | (D50−D10)/D50 | (D90−D50)/D50 | Tap density (g/cm³) |
| Ex-1 | Separation + dehydration | Al (Coating) | 12.2 | 50 | 1200 | 11.3 | 15.4 | 18.6 | 0.27 | 0.21 | 2.2 |
| Ex-2 | Separation + dehydration | Al (Coating) | 11.8 | 50 | 800 | 20.3 | 25.7 | 29.2 | 0.21 | 0.14 | 2.3 |
| Ex-3 | Separation + dehydration | Al (Coating) | 12.0 | 50 | 1200 | 16.7 | 21.7 | 26.0 | 0.23 | 0.20 | 2.3 |
| Ex-4 | Separation + dehydration | Al (Coating) | 12.2 | 35 | 1200 | 10.6 | 13.8 | 16.7 | 0.23 | 0.21 | 2.1 |
| Ex-5 | Separation + dehydration | Al (dispersion) | 12.2 | 50 | 1200 | 10.9 | 14.2 | 17.3 | 0.23 | 0.22 | 2.1 |
| Ex-6 | Separation + dehydration | Mg (dispersion) | 12.2 | 50 | 1200 | 12.0 | 16.1 | 19.7 | 0.25 | 0.22 | 2.2 |

TABLE 1-continued

| | Production Conditions for Compound Hydroxide | | | | | Compound Hydroxide | | | | | |
|---|---|---|---|---|---|---|---|---|---|---|---|
| | Separation process | Added element(s) | pH value | Temperature (° C.) | Mixing (rpm) | D10 Particle size (μm) | D50 Particle size (μm) | D90 Particle size (μm) | (D50-D10)/D50 | (D90-D50)/D50 | Tap density (g/cm³) |
| Ex-7 | Separation + dehydration | — | 12.2 | 50 | 1200 | 11.3 | 15.4 | 18.6 | 0.27 | 0.21 | 2.2 |
| Ex-8 | Separation + dehydration | Al (Coating) | 11.6 | 50 | 1200 | 13.1 | 16.2 | 19.3 | 0.19 | 0.19 | 1.8 |
| Ex-9 | Separation + dehydration | Al (Coating) | 12.2 | 50 | 1200 | 9.3 | 11.5 | 13.9 | 0.19 | 0.21 | 1.9 |
| Ex-10 | Separation | Al (Coating) | 12.2 | 50 | 1200 | 13.6 | 18.9 | 23.7 | 0.28 | 0.25 | 2.2 |
| Ex-11 | Separation + dehydration | Al (Coating) | 12.2 | 50 | 600 | 19.6 | 26.8 | 31.1 | 0.27 | 0.16 | 2.1 |
| Ex-12 | Separation + dehydration | Al (Coating) | 12.2 | 50 | 1000 | 8.3 | 11.2 | 14.0 | 0.26 | 0.25 | 2.1 |
| Cx-1 | — | Al (Coating) | 12.2 | 50 | 1200 | 8.4 | 15.2 | 28.9 | 0.45 | 0.90 | 1.8 |
| Cx-2 | — | Al (Coating) | 11.8 | 50 | 800 | 14.8 | 24.8 | 39.2 | 0.40 | 0.58 | 1.9 |

(Ex = Example, Cx = Comparative Example)

TABLE 2

| | Cathode Active Material | | | | | | Rechargeable Battery |
|---|---|---|---|---|---|---|---|
| | D10 particle size (μm) | D50 particle size (μm) | D90 particle size (μm) | (D50-D10)/D50 | (D90-D50)/D51 | Tap density (g/cm³) | Capacity maintenance rate (%) |
| Ex-1 | 11.5 | 15.5 | 18.7 | 0.26 | 0.21 | 2.4 | 98.8 |
| Ex-2 | 20.1 | 25.6 | 29.1 | 0.21 | 0.14 | 2.3 | 98.6 |
| Ex-3 | 16.5 | 21.5 | 26.2 | 0.23 | 0.22 | 2.3 | 98.5 |
| Ex-4 | 10.5 | 13.9 | 16.5 | 0.24 | 0.19 | 2.4 | 98.7 |
| Ex-5 | 10.7 | 14.1 | 17.2 | 0.24 | 0.22 | 2.4 | 98.9 |
| Ex-6 | 11.8 | 16.0 | 19.8 | 0.26 | 0.24 | 2.4 | 98.6 |
| Ex-7 | 15.3 | 18.1 | 21.1 | 0.15 | 0.17 | 2.3 | 98.5 |
| Ex-8 | 13.0 | 16.3 | 19.1 | 0.20 | 0.17 | 2.2 | 97.9 |
| Ex-9 | 9.4 | 11.7 | 14.1 | 0.20 | 0.21 | 2.3 | 97.8 |
| Ex-10 | 13.6 | 19.0 | 23.6 | 0.28 | 0.24 | 2.3 | 97.9 |
| Ex-11 | 19.5 | 26.9 | 31.1 | 0.28 | 0.16 | 2.2 | 98.1 |
| Ex-12 | 8.4 | 11.1 | 14.1 | 0.24 | 0.27 | 2.2 | 98.2 |
| Cx-1 | 8.3 | 15.3 | 29.0 | 0.46 | 0.90 | 2.0 | 96.9 |
| Cx-2 | 14.6 | 25.0 | 39.4 | 0.42 | 0.58 | 2.1 | 97.1 |

(Ex = Example, Cx = Comparative Example)

From the results in Table 1 and Table 2, it can be seen that when the cathode active material that is obtained with a composite hydroxide as a precursor that satisfies the relationships (D50–D10)/D50≤0.30, and (D90–D50)/D50≤0.30 among D10, D50 and D90 is used in a non-aqueous electrolyte secondary battery, it is possible to improve the capacity maintenance rate of the battery to 97.5% or greater. Particularly, it can be seen that by regulating the tap density and average particle size to suitable ranges, the capacity maintenance rate can be improved to 98.0% or greater, and the cycling characteristics can be greatly improved.

EXPLANATION OF REFERENCE NUMBERS

1 Reaction vessel
2 Mixing means
3 Raw material aqueous solution supply means
4 Ammonium ion supply aqueous solution supply means
5 Caustic alkali aqueous solution supply means
6 Pump
7 Separation means
8 Receiving vessel
9 Reflux apparatus
10 2032 lithium cell
11 Case
1a Cathode can
11b Anode can
11c Gasket
12 Electrode
12a Cathode
12b Anode
12c Separator

What is claimed is:

1. In combination, a nickel-cobalt composite hydroxide and a production device for producing the nickel-cobalt composite hydroxide, the combination comprising:
the nickel-cobalt composite hydroxide comprising
a general formula: $Ni_{1-x-y}Co_xM_y(OH)_2$ (where, 0.05≤x≤0.50, 0≤y≤0.10, 0.05≤x+y≤0.50, and M is at least one kind of metal element selected from among Al, Mg, Mn, Ti, Fe, Cu, Zn and Ga,
an average particle size of within a range from 10 μm to 30 μm, and
(D50–D10)/D50≤0.30, and (D90–D50)/D50≤0.30 among D10, D50 and D90 of the nickel-cobalt composite hydroxide; and the production device comprising
- a reaction vessel;
- a constant volume pump for continuously supplying an aqueous solution including nickel and cobalt, an aqueous solution including an ammonium ion donor, and a caustic alkali aqueous solution to the reaction vessel;
- a constant volume pump for with an extraction nozzle for continuously extracting nickel-cobalt composite hydroxide generated by a reaction inside the reaction vessel from the reaction vessel by way of the extraction nozzle;
- a separation apparatus separating the extracted nickel-cobalt composite hydroxide into a large particle size portion and a small particle size portion by classification; and
- a reflux apparatus continuously returning the small particle size portion separated out to the reaction vessel.

2. The combination of claim 1, wherein the nickel-cobalt composite hydroxide has a tap density of 2.0 g/cm$^3$ or greater.

* * * * *